Patented Dec. 30, 1924.

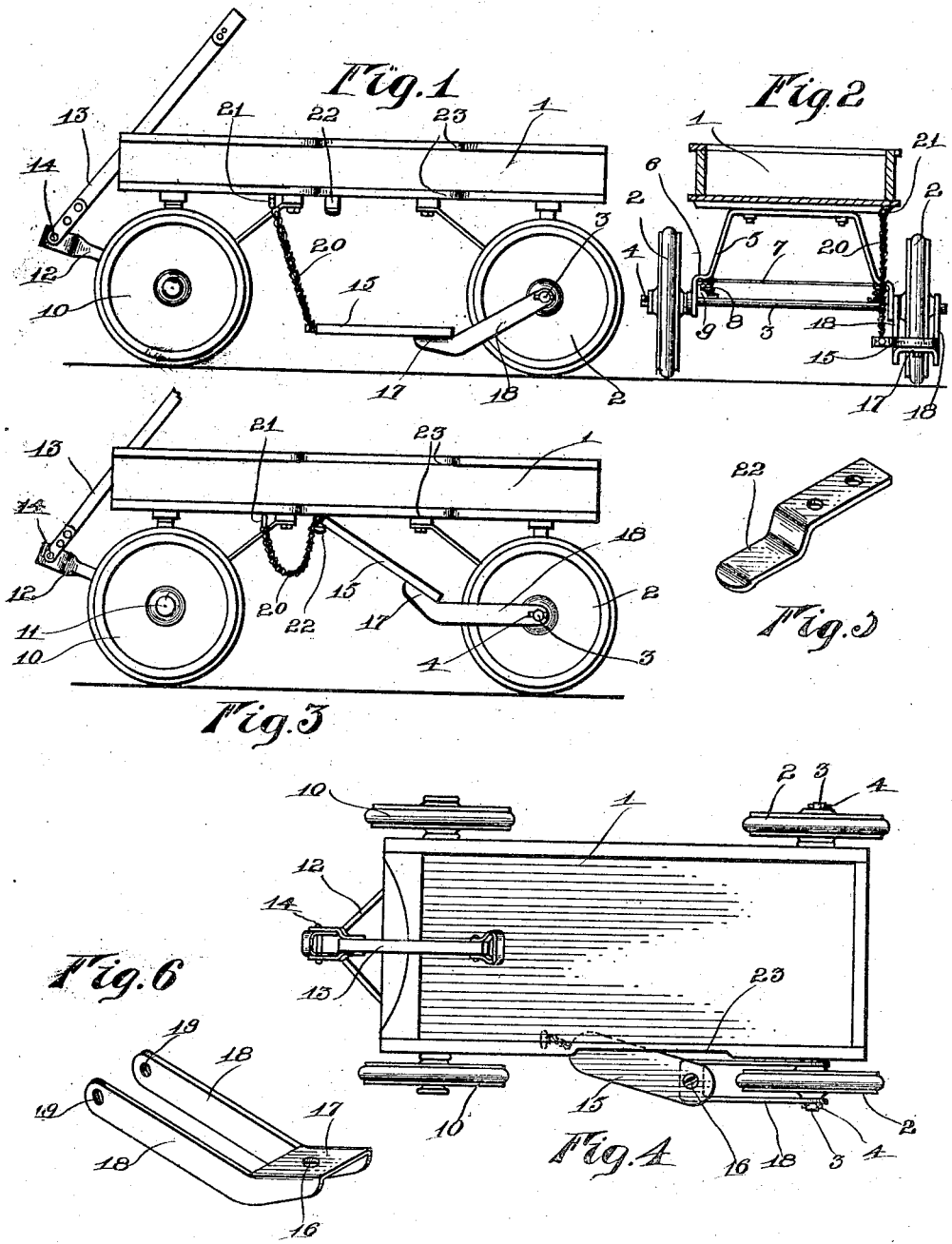

1,521,180

UNITED STATES PATENT OFFICE.

JOHN HEBERLING, OF ROCHESTER, NEW YORK.

VEHICLE FOR CHILDREN.

Application filed April 2, 1923. Serial No. 629,247.

*To all whom it may concern:*

Be it known that I, JOHN HEBERLING, a citizen of the United States, and resident of Rochester, in the county of Monroe and State of New York, have invented certain new and useful Improvements in Vehicles for Children, of which the following is a specification.

The present invention relates to vehicles for children, and an object thereof is to provide a step of simple and inexpensive construction arranged at one side of the vehicle between the front and the rear wheel, in such a position that a child may stand thereon with one foot, propel the vehicle with the other foot and steer the vehicle with his hand through the steering tongue. Another object of the invention is to so support the step from the rear axle that the greater portion of the weight of the child may be sustained independently of the body.

To these and other ends, the invention consists of certain parts and combinations of parts, all of which will be hereinafter described: the novel features being pointed out in the appended claims.

In the drawings:

Fig. 1 is a side view of a vehicle constructed in accordance with this invention, showing the step lowered;

Fig. 2 is a vertical section through the vehcle;

Fig. 3 is a side view showing the step in raised position;

Fig. 4 is a plan view of the vehicle;

Fig. 5 is a perspective view of the device which supports the step in its elevated position; and Fig. 6 is a perspective view of the supporting member for the step.

Referring more particularly to the drawings, 1 indicates the body which is supported at its rear by two rear wheels 2, connected by an axle 3, the wheels being held on the axle by cotter pins 4. The body carries an inverted U-shaped frame 5 with off set portions 6, the arms of the U-shaped portion being slotted and the off set portions being connected by a cross piece 7 which abuts two springs 8 supported on seats 9 on the axle. This arrangement gives a spring support to the rear end of the body. The forward end of the body is supported by front wheels 10 connected by an axle 11 secured resiliently, similar to the rear wheels, in a frame 12 which is mounted to turn at the forward end of the vehicle. To this frame the combined steering and draft tongue 13 is pivoted at 14, being adapted to swing rearwardly over the forward end of the vehicle, as shown in Fig. 1, for steering purposes.

Arranged on one side of the body and between the forward and rear wheels on said side is a step 15 which is supported from the rear axle 3. In order to support the step from the axle, the latter is preferably pivoted at 16 to a cross member or plate 17 which connects two arms 18 arranged to lie on opposite sides of one of the wheels 2 and having bearings 19 in their free ends through which the axle 3 extends. The forward end of this step is through a flexible connection 20 connected with the body of the vehicle at 21. This arrangement permits the step to lie in a lowermost position, illustrated in Fig. 1, or to be moved upwardly in order to be supported on a bracket arm 22 secured also to the bottom of the vehicle, the pivot 16 permitting the step to be swung into and out of engagement with the bracket 22, engagement with the bracket being illustrated in Fig. 3. The side of the vehicle above the step is preferably cut away at 23 in order that the leg of the child may rest nearer to the center of the vehicle. When the step is in its lowermost position it lies with its length at a slight angle to the longitudinal axis of the vehicle so that the foot of a child may project in a natural position slightly under the body of the vehicle.

From the foregoing it will be seen that there has been provided a vehicle for children in which a step is arranged on one side of the vehicle between the front and the rear wheel on said side, being supported from the rear axle preferably by a frame which straddles the rear wheel and engages the axle on opposite sides of the wheel. This frame is pivotally mounted on the axle so that the step may be swung to and from an out of the way position and the step is supported at it outer end by a flexible connection with the body of the vehicle. In this way a large portion of the weight of the step is carried by the axle, so that the body is not materially tilted on the axle due to the interposition of springs between the body and the axle. The flexible connection also permits the step to be readily shifted to and from its out of the way position. The axle also provides an axis, extending transversely of the vehicle, about which the step may be swung toward and from its position of use.

What I claim as my invention and desire to secure by Letters Patent is:

1. In a vehicle for children, the combination with a box-like body, rear wheels supporting the body, steerable front wheels for the body and a steering member connected to the front wheels, of a step, and means for supporting the step beyond one side of and below the box-like body between the front wheel and the rear wheel on said side, said means being connected to the axle of the adjacent rear wheel.

2. In a vehicle for children, the combination with a body, rear wheels supporting the body, steerable front wheels for the body and a steering member connected to the front wheels, of a step, and means for supporting the step to one side of the body between the front wheel and the rear wheel on said side, said means being pivoted to the axle of the adjacent rear wheel to swing relatively to the body.

3. In a vehicle for children, the combination with a box-like body, rear wheels supporting the body, steerable front wheels for the body, and a steering member connected to the front wheels, of a step, and means for supporting the step beyond one side of and below the box-like body between the front wheel and the rear wheel on said side, said means embodying two arms lying on opposite sides of the adjacent rear wheel and connected to the axle thereof relatively to the body.

4. In a vehicle for children, the combination with a body, rear wheels supporting the body, steerable front wheels for the body and a steering member connected to the front wheels, of a step, and means for supporting the step to one side of the body between the front wheel and the rear wheel on said side, said means embodying a frame mounted to swing on the axle of the adjacent rear wheel relatively to the body.

5. In a vehicle for children, the combination with a body, rear wheels supporting the body, steerable front wheels for the body and a steering member connected to the front wheels, of a step, and means for supporting the step to one side of the body between the front wheel and the rear wheel on said side, said means comprising a swinging frame mounted to turn about an axis extending transversely of the vehicle and connected to the rear end of the step and means connected to the forward end of the step and to the vehicle body.

6. In a vehicle for children, the combination with a body, rear wheels supporting the body, steerable front wheels for the body and a steering member connected to the front wheels, of a step, and means for supporting the step to one side of the body between the front wheel and the rear wheel on said side, said means comprising a frame mounted to swing about an axis extending transversely of the vehicle in rear of the step and having the step pivoted thereto to swing about an upright axis at its rear end, and a flexible connection between the forward end of the step and the vehicle body.

7. In a vehicle for children, the combination with a body, rear wheels supporting the body, steerable front wheels for the body and a steering member connected to the front wheels, of a step, and means for supporting the step to one side of the body between the front wheel and the rear wheel on said side, said means comprising a frame having two arms lying on opposite sides of the rear wheel and mounted to swing on the axle of the rear wheel and pivotally connected to the rear end of the step to permit the latter to swing about an upright axis, and a flexible connection between the forward end of the step and the vehicle body.

8. In a vehicle for children, the combination with box-like body, rear wheels for supporting the body, steerable front wheels for the body, and a steering member connected to the front wheels, of a step, and means for supporting the step beyond and below the box-like body between the front wheel and the rear wheel on said side, said means embodying means extending rearwardly from the step and connecting with the axle and means extending upwardly with the forward end of the step and connected with the body.

9. In a vehicle for children, the combination with a box-like body, rear wheels for supporting the body, steerable front wheels for the body, and a steering member connected to the front wheels, of a step, and means for supporting the step beyond one side of and below the box-like body between the front wheel and the rear wheel on said side, said means embodying means extending rearwardly from the step and connecting with the axle and means extending upwardly with the forward end of the step and connected with the body, said means comprising a frame extending rearwardly from the step and connecting with the axle, and flexible means extending from the forward portion of the step upwardly and connected to the body.

JOHN HEBERLING.